UNITED STATES PATENT OFFICE.

CHARLES OSWALD, HERMANN LORÉTAN, AND CHARLES DE LA HARPE, OF BASEL, SWITZERLAND, ASSIGNORS TO DYEWORKS FORMERLY L. DURAND HUGUENIN & CO., OF BASEL, SWITZERLAND.

GREEN DYE AND PROCESS OF MAKING SAME.

No. 807,182.      Specification of Letters Patent.      Patented Dec. 12, 1905.

Application filed September 12, 1905. Serial No. 278,087. (Specimens.)

*To all whom it may concern:*

Be it known that we, CHARLES OSWALD, HERMANN LORÉTAN, and CHARLES DE LA HARPE, citizens of the Swiss Republic, and residents of Basel, Switzerland, have invented new and useful Green Dyestuffs and a Process of Making the Same, of which the following is a full, clear, and complete specification.

We have found that by treating the yellowish-green dyestuffs obtained as described in our application of Letters Patent executed at the same time as the present one by the action of formaldehyde on gallocyanin dyestuffs with neutral, acid, or alkaline reducing agents—as, for instance, stannous chlorid, zinc, aluminium, hydrosulfites, and their compounds with aldehydes, alkali sulfids, hydrogen sulfid, titanium chlorid, glucose, &c.—in a convenient medium the said dyestuffs are modified and become more soluble in water. An excess of the reducing agent does no harm. The yellowish aqueous solutions of the modified dyestuffs give by addition of sodium acetate a yellow precipitate, and these dyestuffs dye with chromium mordanted fibers vivid green tints which are a little bluer and more intense than the tints obtained with the dyestuffs which are employed as parent materials. By addition of an acid and of a small quantity of sodium nitrite to the yellow aqueous solutions of the new dyestuffs the coloration of these solutions turns to intense fuchsin red. The solutions of these dyestuffs in concentrated sulfuric acid are slightly colored dirty reddish and turn to intense blue-green by addition of a small quantity of an oxidant, such as manganese dioxid.

Example I: Thirty-seven kilos of the dyestuff obtained by the action of formaldehyde on the gallocyanin dyestuff resulting from the reaction of nitrosodiethylanilin hydrochlorid and gallamic acid are dissolved in one thousand liters water, and to the obtained solution are added by degrees and while stirring a quantity of sodium hydrosulfite or of its compound with formaldehyde corresponding in strength with ten kilos of pure hydrosulfite. Then twenty kilos of hydrochloric acid of 21° Baumé are added by degrees and while heating. Finally the mixture is filtered and mixed with two hundred and fifty kilos of common salt to precipitate the leuco-dyestuff which is separated by filtration, pressed, and dried.

Example II: Thirty-seven kilos of the same parent dyestuff as in Example I are dissolved in one thousand liters water. Then are added by degrees and alternately, while well stirring, twelve kilos of powdered zinc and thirty-seven kilos of hydrochloric acid of 21° Baumé. The temperature is then raised gradually by heating and the mixture filtered. The leuco dyestuff is precipitated from the filtrate by two hundred and fifty kilos of common salt, pressed, and dried.

What we claim is—

1. The described process for the manufacture of dyestuffs dyeing with chromium mordanted fibers green, by treating with reducing agents the yellowish-green dyestuff obtained by the action of formaldehyde on gallocyanin dyestuffs.

2. The described process for the manufacture of dyestuffs dyeing with chromium mordanted fibers green, by treating with reducing agents the yellowish-green dyestuffs obtained by the action of formaldehyde on the gallocyanin dyestuffs resulting from the reaction of a nitrosodialkylanilin hydrochlorid on gallamic acid.

3. As a new article of manufacture, the described dyestuff resulting from the action of a reducing agent on the yellowish-green dyestuff obtained by the action of formaldehyde on a gallocyanin dyestuff, which is easily soluble in water with yellow coloration turning to intense fuchsin red by addition of an acid and of a small quantity of sodium nitrite, dissolves in concentrated sulfuric acid with a slightly-reddish dirty coloration, turning to intense blue-green by addition of a small quantity of an oxidant, and whose aqueous solution gives by addition of sodium acetate a yellow precipitate.

In witness whereof we have hereunto signed our names, this 31st day of August, 1905, in the presence of two subscribing witnesses.

CHARLES OSWALD.
    HERMANN LORÉTAN.
    CHARLES DE LA HARPE.

Witnesses:
    GEO. GIFFORD,
    AMAND RITTER.